United States Patent [19]
Ross

[11] 4,351,204
[45] Sep. 28, 1982

[54] ACCESSORY DRIVE ASSEMBLY WITH COMPACT GEAR DIFFERENTIAL

[75] Inventor: Louis Ross, Addison, Ill.

[73] Assignee: Borg-Warner Corporation, Chicago, Ill.

[21] Appl. No.: 92,885

[22] Filed: Nov. 9, 1979

[51] Int. Cl.³ .......................... F16H 1/28; F16H 37/08
[52] U.S. Cl. ........................................ 74/804; 74/805; 74/701; 74/336 B
[58] Field of Search ................ 74/336 R, 336 B, 337, 74/804, 805, 390, 710, 701, 714

[56] References Cited

U.S. PATENT DOCUMENTS

| | | | |
|---|---|---|---|
| 1,222,097 | 4/1917 | Gould | 74/714 |
| 1,483,606 | 2/1924 | Krohn | 74/714 |
| 1,703,064 | 2/1929 | Griffiths | 74/714 X |
| 2,831,373 | 4/1958 | Weis | 74/804 |
| 2,972,265 | 2/1961 | Walter | 74/714 X |
| 3,109,326 | 11/1963 | Holtan | 74/701 X |
| 3,886,805 | 6/1975 | Koderman | 74/804 |
| 4,177,695 | 12/1979 | Grove | 74/804 |

FOREIGN PATENT DOCUMENTS

| | | | |
|---|---|---|---|
| 1058331 | 5/1959 | Fed. Rep. of Germany | 74/804 |
| 50-43056 | 10/1975 | Japan | 74/336 B |

Primary Examiner—Leslie A. Braun
Assistant Examiner—Lawrence J. Gotts
Attorney, Agent, or Firm—Julian Schachner

[57] ABSTRACT

An automotive accessory drive assembly includes a two-member differential which is arranged to provide three-member differential action. The accessories are driven through the differential at low engine speeds, and are driven through a speed-reducing drive train at high engine speeds.

3 Claims, 3 Drawing Figures

ACCESSORY DRIVE ASSEMBLY WITH COMPACT GEAR DIFFERENTIAL

BACKGROUND OF THE INVENTION

This invention relates generally to drive systems. More particularly, it relates to an assembly which is adapted to drive the accessories in a vehicle. In such an adaptation, a compact gear differential is used to boost accessory speeds at relatively low engine speeds, thus allowing lower accessory speeds at relatively high engine speeds.

Modern vehicle engines are called upon to drive an increasing number of accessories. As much as twenty-five percent of the engine brake horsepower available may be required to drive them. Thus the efficiency of the accessory drive system is important in so far as it relates to fuel economy.

The ideal condition would be to drive the accessories at a constant speed. This is impractical in an automotive vehicle. Generally an accessory drive system drives accessories at some speed which is a linear function of engine speed. At low engine speeds, for example at engine idle speed, the accessories may be driven so slowly as to be inefficient. Similarly, at high engine speeds the accessories may be driven too fast for efficient operation. There remains a need in the art for a simple, inexpensive accessory drive assembly with the capability of compressing the accessory drive speed range as compared with the engine speed range of an associated vehicle.

SUMMARY OF THE INVENTION

This invention is directed to such an assembly. To that end, an accessory drive system incorporates a differential having two main members exemplified by the inner and outer gears of a geroter gear set. The outer gear rotates on a fixed center. The inner gear orbits and rotates. Thus, three movements are obtained from only two members. The result, in effect, is three-member gear differential action.

The differential drives the vehicle accessories at low engine speeds. The accessories are driven by the engine through a reduction mechanism at high engine speeds. The result is that the accessories are driven within a speed range that is compressed as compared with the engine speed range.

BRIEF DESCRIPTION OF THE DRAWING

The objects and advantages of this invention will become apparent to those skilled in the art upon careful consideration of the specification herein, including the drawing, wherein.

Figure 1:
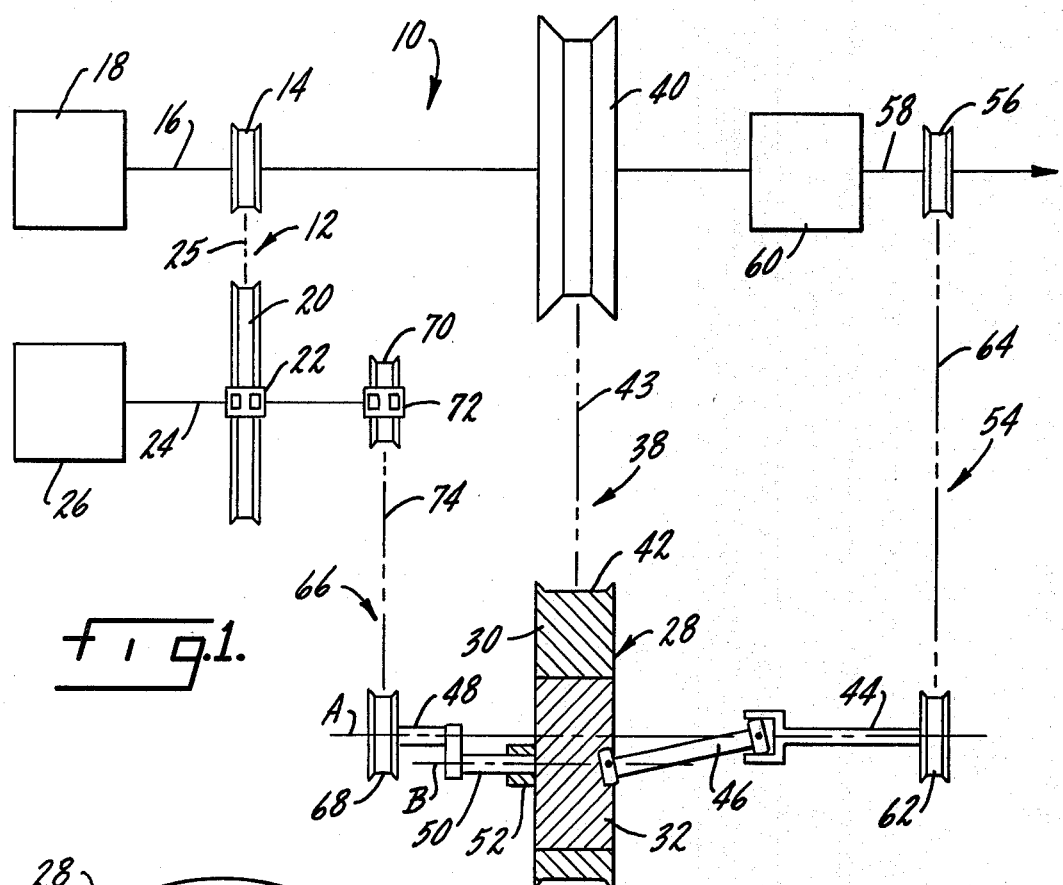
FIG. 1 shows a schematic view of the accessory drive assembly.

While this invention is susceptible of embodiment in many different forms, there is shown in the drawing and herein will be described in detail a preferred embodiment. It should be understood that the present disclosure is considered to be an exemplification of the principles of the invention, and is not intended to limit the invention to this embodiment.

DESCRIPTION OF A PREFERRED EMBODIMENT

Referring to the drawing in further detail, there is shown an accessory drive assembly 10. Assembly 10 includes a first drive train 12 having a pulley 14 rotatable with the crankshaft 16 of an associated vehicle engine 18. Another pulley 20 is mounted on a first one-way overrunning clutch 22. This clutch 22 is rotatable with an accessory drive shaft 24. A suitable belt 25 couples pulleys 14,20. In a preferred form of the invention, drive train 12 has a 1:3 underdrive or speed-reducing ratio. Shaft 24 is connected to drive the associated vehicle accessories 26, and the arrangement is such that shaft 24 may overrun pulley 20 of drive train 12. Thus, engine 18 drives accessories 26 at some reduced speed so long as overrunning clutch 22 is engaged.

A compact gear differential 28 is exemplified by a geroter gear set having an outer ring gear 30 and an inner star gear 32. Ring gear 30 is rotatable on its own fixed axis A and defines a plurality of inwardly facing ring gear teeth 34. Star gear 32 is orbital about axis A and rotatable on its own axis B. Gear 32 defines a plurality of outwardly facing star gear teeth 36 in meshing relationship with teeth 34. In a preferred form of the invention, there may be, for example, seven teeth 34 and six teeth 36.

A second drive train 38 includes a pulley 40 rotatable with crankshaft 16. Ring gear 30 defines another pulley 42, and a suitable belt 43 couples pulleys 40,42. In a preferred form of the invention, drive train 38 has a 1:1 direct drive ratio. Thus, ring gear 30 is driven as a differential input member at the speed of engine 18.

A first differential output member 44 is rotatable on axis A. A suitable wobble shaft 46 or the like connects shaft 44 on axis A with star gear 32 on its axis B. As is well known in the art, this relationship transmits rotational movement between star gear 32 and shaft 44, but is not responsive to orbital movement of star gear 32.

A second differential output member 48 is rotatable on axis A. A suitable crank 50 or the like is connected to member 48 and is journaled in a bearing 52 supported by star gear 32 on its axis B. The throw of crank 50 is equal to the eccentricity of axes AB such that orbital movement of star gear 32 is translated into rotational movement of member 48.

If desired, ring gear 30 could form part of a differential housing which is suitably journalled on members 44 and 48. Such an arrangement is considered to be conventional, and need not be described in detail.

A third drive train 54 includes a pulley 56 rotatable with an output shaft 58 of an associated manual or automatic automotive transmission 60. Another pulley 62 is secured to member 44 for rotation therewith. A suitable belt 64 couples pulleys 56,62. In a preferred form of the invention, drive train 54 has a 1:1 direct drive ratio.

A fourth drive train 66 includes a pulley 68 secured to member 48 for rotation therewith. Another pulley 70 is mounted on a second one-way overrunning clutch 72. This clutch 72 is rotatable with shaft 24. A suitable belt 74 couples pulleys 68,70. In a preferred form of the invention, drive train 66 has a 1:1 direct drive ratio. The arrangement is such that shaft 24 may overrun pulley 70 of drive train 66.

The characteristics of geroter gear set 28 are such that the summation of actions of star gear 32 equals the action of ring gear 30. In other words, there can be any combination of orbital and rotational movement of star gear 32 so long as this combination of movements is equal, in a qualitative sense, to the rotational movement of ring gear 30.

Figure 2:
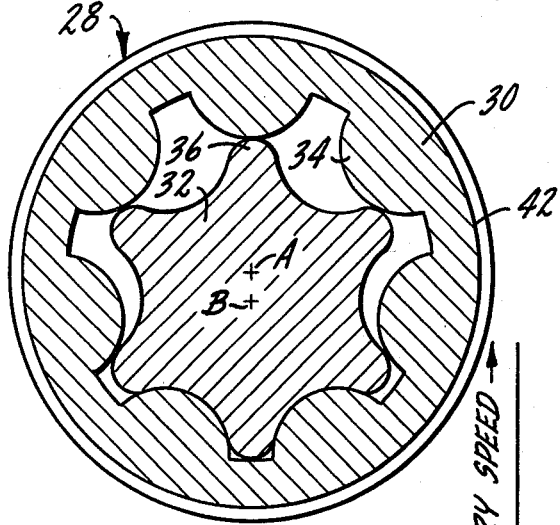
FIG. 2 shows a sectional view of the geroter gear set used as a differential.
Figure 3:
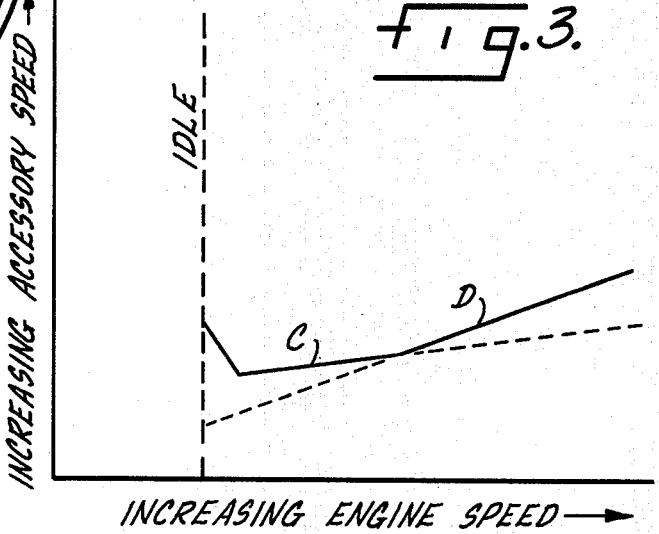
FIG. 3 is a graph relating accessory speed to engine speed.

In operation, it is assumed first that engine 18 is running at idle speed, transmission 60 is in neutral, and the vehicle is stationary. Crankshaft 16 is driving ring gear 30 of differential 28 through drive train 38. As the vehicle is stationary, shaft 58 also is stationary. Thus, the rotational speed of member 44 is zero, and star gear 32 cannot rotate on axis B. In this condition, and with the configuration of gear teeth shown in FIG. 2, there will be seven orbits of star ger 32 for each revolution of ring gear 30. Orbital movement of star gear 32 is translated by crank 50 into rotational movement of member 48. This drives shaft 24 through drive train 66 faster than shaft 24 would be driven through drive train 12. Overrunning clutch 72 is engaged, and overrunning clutch 22 is disengaged. Thus it will be seen that at engine idle speed, accessories 26 are driven faster through differential 28 than they would be driven through drive train 12. This is shown graphically as curve C in FIG. 3.

When the vehicle operator engages transmission 60, the vehicle begins moving. Shaft 58 and member 44 start to rotate. This rotational movement of member 44 is translated into rotation of star gear 32 on axis B. The summation of actions within differential 28 is such that, in a relative sense, there is a reduction of six revolutions of member 48 for each revolution of member 44. It should be emphasized that this relationship is relative. Actually, as engine speed increases, the rotational speed of ring gear 30 increases correspondingly, such that member 48 in fact rotates in the same direction as, but increasingly slower than ring gear 30.

As vehicle speed increases, the rotational speed of member 44 increases. At some point, there will be a tendency for engine 18 to drive output shaft 24 through drive train 12 faster than through differential 28. At that point, clutch 72 disengages and shaft 24 overruns pulley 70. Similarly, clutch 22 engages and accessory drive is directed from engine 18 through drive train 12. This is shown graphically in FIG. 3, where at relatively high engine speeds the corresponding accessory speeds follow curve D.

Thus, it will be seen that the accessory drive assembly disclosed herein provides a speed range for driving accessories which is more uniform than that typically in use at the present time. The assembly boosts accessory speeds at low engine speeds, and allows the accessories to be driven at reduced speeds when operation is at high engine speeds.

The differential disclosed herein is exemplified as a greater gear set by way of example. However, other well known mechanisms are suitable for this application. For example, trochoidal gear sets are particularyly suitable, as they have very strong construction and good pressure angles. The trochoidal gear set skips two teeth for every orbit of the inner gear, as there is a difference of two teeth between the inner and outer gears, rather than a one tooth difference as with the geroter gear set. Thus it is possible to get the same action with the trochoidal gear set as with the geroter gear set. In addition, other gear ratios are obtainable with the trochoidal gear set which would be unobtainable with the geroter gear set.

Other mechanisms which would be suitable for this application might be a bevel gear differential, a planetary gear set where the ring gear, carrier and sun gear turn, a belt drive where one or more of the pulleys is transported in rotation and, for example, a hydromechanical transmission where pump and motor blocks are rotated together and hydraulic action provides the differential effect. Reference to a geroter gear set as used herein is intended to include suitable alternative mechanisms.

Drive trains 12,38,54,66 are shown as belt/pulley devices by way of example. Obviously, chain or gear drives or other suitable drives could be incorporated in the design.

Also by way of example, drive train 12 has a 1:3 reduction ratio and drive trains 38,54,66 have a 1:1 direct drive ratio. Obviously, other ratios may be used in accordance with design requirements. The important point is that at low engine speeds, drive through differential 28 is faster than drive through drive train 12. At high engine speeds, drive through drive train 12 is at a reduction ratio.

It is apparent that although the invention as disclosed herein provides a novel arrangement for driving the accessories of an associated automotive vehicle, it is readily adaptable for use in other environments where similar operating characteristics may be desired.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. In a vehicle having an engine with a crankshaft, a transmission with an output shaft, and associated accessories with a drive shaft, an accessory drive assembly comprising a first speed-reducing drive train adapted for driven engagement with said crankshaft and driving engagement with said drive shaft, said first drive train being constructed and arranged such that said drive shaft may overrun said first drive train, a differential including an outer ring gear rotatable on a first axis, an inner star gear orbital about said first axis and rotatable on a second axis, first and second members rotatable on said first axis, means connecting said star gear with said first member for transmitting rotational movement therebetween, and means connecting said star gear with said second member for translating orbital movement of said star gear into rotational movement of said second member, a second drive train adapted for driven engagement with said crankshaft and in driving engagement with said ring gear, a third drive train adapted for driven engagement with said output shaft and in driving engagement with said first member, and a fourth drive train in driven engagement with said second member and adapted for driving engagement with said drive shaft, said fourth drive train being constructed and arranged such that said drive shaft may overrun said fourth drive train.

2. The invention of claim 1, said first drive train including a first overrunning clutch adapted to be coupled with said drive shaft.

3. The invention of claim 1 or 2, said fourth drive train including a second overrunning clutch adapted to be coupled with said drive shaft.

* * * * *